US012631215B2

(12) United States Patent
Arai

(10) Patent No.: US 12,631,215 B2
(45) Date of Patent: May 19, 2026

(54) SLIDING COMPONENTS

(71) Applicant: EAGLE INDUSTRY CO., LTD.,
Tokyo (JP)

(72) Inventor: Minehiro Arai, Tokyo (JP)

(73) Assignee: EAGLE INDUSTRY CO., LTD.,
Tokyo (JP)

( * ) Notice: Subject to any disclaimer, the term of this patent is extended or adjusted under 35 U.S.C. 154(b) by 100 days.

(21) Appl. No.: 17/772,499

(22) PCT Filed: Nov. 2, 2020

(86) PCT No.: PCT/JP2020/041089
§ 371 (c)(1),
(2) Date: Apr. 27, 2022

(87) PCT Pub. No.: WO2021/095592
PCT Pub. Date: May 20, 2021

(65) Prior Publication Data
US 2022/0389961 A1 Dec. 8, 2022

(30) Foreign Application Priority Data
Nov. 15, 2019 (JP) ................................. 2019-207206

(51) Int. Cl.
*F16C 33/16* (2006.01)
*F16C 33/74* (2006.01)

(52) U.S. Cl.
CPC .............. *F16C 33/16* (2013.01); *F16C 33/74* (2013.01); *F16C 2240/54* (2013.01)

(58) Field of Classification Search
CPC ....... F16J 15/3464; F16C 33/16; F16C 33/74; F16C 2240/54
See application file for complete search history.

(56) References Cited

U.S. PATENT DOCUMENTS

| | | | | |
|---|---|---|---|---|
| 9,841,107 B2 * | 12/2017 | Otschik | ............... | F16J 15/3496 |
| 10,280,977 B2 * | 5/2019 | Itadani | ................... | F16J 15/363 |
| 2001/0031346 A1 | 10/2001 | Iwamura | | |
| 2002/0167133 A1 | 11/2002 | Bivens | ........................ | 277/436 |
| 2007/0141347 A1 | 6/2007 | Nakagawa et al. | | |
| 2008/0000293 A1 * | 1/2008 | Kitazawa | ............... | G01Q 70/12 |
| | | | | 977/956 |

(Continued)

FOREIGN PATENT DOCUMENTS

| | | | | |
|---|---|---|---|---|
| CN | 110296149 | 10/2019 | ............. | F16C 33/00 |
| EP | 1798305 A | 6/2007 | | |

(Continued)

OTHER PUBLICATIONS

International Preliminary Report on Patentability issued in PCT/JP2020/041089, dated May 17, 2022, 6 pages.

(Continued)

*Primary Examiner* — Christine M Mills
*Assistant Examiner* — L. Susmitha Koneru
(74) *Attorney, Agent, or Firm* — HAYES SOLOWAY P.C.

(57) ABSTRACT
Provided are sliding components capable of obtaining a stable low-friction effect under a wide range of conditions of use. A sliding component has a relatively sliding surface. A base material of one of the sliding components is coated with a graphite film, and the sliding surface of the other of the sliding components is made of the graphite film.

18 Claims, 4 Drawing Sheets

(56) References Cited

U.S. PATENT DOCUMENTS

| | | | | |
|---|---|---|---|---|
| 2009/0060408 A1* | 3/2009 | Nagasaka | ............. | C23C 16/274 |
| | | | | 384/625 |
| 2011/0121518 A1* | 5/2011 | Peng | .................... | F16J 15/3496 |
| | | | | 277/404 |
| 2015/0061229 A1* | 3/2015 | Ryther | ................. | F16J 15/3224 |
| | | | | 277/375 |
| 2015/0226260 A1 | 8/2015 | Inami et al. | | |
| 2016/0053895 A1* | 2/2016 | Otschik | ............... | F16J 15/3496 |
| | | | | 277/405 |
| 2017/0051857 A1* | 2/2017 | Sakakura | ................ | B24B 37/34 |
| 2017/0370475 A1* | 12/2017 | Sakakura | ............. | F04B 53/143 |
| 2018/0112711 A1* | 4/2018 | Itadani | .................... | C23C 16/26 |
| 2018/0291815 A1* | 10/2018 | Munson | ............... | F01D 25/183 |

FOREIGN PATENT DOCUMENTS

| | | | | |
|---|---|---|---|---|
| JP | 6-74239 | 3/1994 | ............. | F16C 33/32 |
| JP | 2001-90766 | 4/2001 | ................ | F16F 9/32 |
| JP | 2004-225725 | 8/2004 | ............. | F16J 15/34 |
| JP | 2007162099 F1 | 6/2007 | | |
| JP | 2008-232014 | 10/2008 | ............. | F04B 39/00 |
| JP | 2010223288 | 10/2010 | ............. | F16C 33/16 |
| JP | 2011-58517 | 3/2011 | ............... | F16J 15/34 |
| JP | 2019015309 | 1/2019 | ............... | F16J 15/34 |

OTHER PUBLICATIONS

International Search Report and Written Opinion issued in PCT/JP2020/041089, dated Dec. 8, 2020, with English translation, 13 pages.

Japanese Official Action issued in Application No. 2021-556031, dated Feb. 13, 2024, with translation 10 pgs.

First Official Action issued in Chinese Appln. No. 202080074865.6, dated Mar. 1, 2024, with translation 10 pgs.

Second Office Action issued in Chinese Patent Appln. Serial No. 202080074865.6, dated Jul. 5, 2024, with English translation, 15 pages.

European Official Action issued in European Patent Appln. Serial No. 20886813.3, dated Sep. 25, 2024, 5 pages.

European Official Action issued in European Patent Appln. Serial No. 24187040.1, dated Oct. 7, 2024, 9 pages.

Decision of Rejection issued in Chinese Patent Appln. Serial No. 202080074865.6, dated Sep. 12, 2024, with English translation, 17 pages.

* cited by examiner

SLIDING COMPONENTS

TECHNICAL FIELD

The present invention relates to sliding components slid-
ing relative to each other and used for a shaft sealing device
that shaft-seals a rotary shaft of a rotating machine in a seal
field such as automotive and general industrial machinery or
a bearing of a machine in a bearing field such as automotive
and general industrial machinery.

BACKGROUND ART

Sliding components have sliding surfaces sliding relative
to each other and are used as components of a bearing
supporting, for example, a rotating or reciprocating shaft or
a shaft sealing device preventing sealing target fluid leakage.
A mechanical seal as an example of the shaft sealing device
preventing sealing target fluid leakage includes a pair of
annular sliding components rotating relative to each other
and having sliding surfaces sliding together. For example,
the sliding component illustrated in Patent Citation 1 is
formed of carbon, which is a soft material, and thus a
low-friction effect can be obtained using the self-lubricating
property of carbon. However, in the event of inter-sliding
surface foreign matter intrusion, the sliding surface of the
sliding component formed of carbon is easily scraped and
there is a problem in terms of foreign matter resistance.

CITATION LIST

Patent Literature

Patent Citation 1: JP 2011-58517 A (Page 6, FIG. 1)
Patent Citation 2: JP 2004-225725 A (Page 6, FIG. 2)

SUMMARY OF INVENTION

Technical Problem

Foreign matter resistance can be enhanced by a sliding
component being formed of SiC, which is a hard material
(for example, Patent Citation 2). However, in a case where
a mechanical seal is used in, for example, a non-lubricated
(dry) environment in which no liquid is interposed between
sliding surfaces, galling may arise on the sliding surface
depending on the conditions of use due to the high friction
coefficient of SiC in the atmosphere. In addition, the sliding
component in Patent Citation 2 has a sliding surface covered
with a diamond-like carbon coating (hereinafter, referred to
as a DLC coating in some cases). The hardness of the DLC
coating is high, and thus galling may arise on the sliding
surface on the other side depending on the conditions of use
in the case of use in a non-lubricated environment or the like.
The sliding component in Patent Citation 2 is poor in
versatility as a low-friction effect can be obtained only after
complicated condition setting such as a change in, for
example, the hydrogen content of the DLC coating in
accordance with the conditions of use.

The present invention has been made in view of such
problems, and an object of the present invention is to
provide a sliding component capable of obtaining a stable
low-friction effect under a wide range of conditions of use.

Solution to Problem

In order to solve the above problem, sliding components
according to the present invention having sliding surfaces sliding relative to each other, a base material of one of the
sliding components is coated with a graphite film and the
sliding surface of the one of the sliding components is made
of the graphite film. According to the aforesaid feature of the
present invention, the base material of the sliding compo-
nent is coated with the graphite film. As a result, the graphite
film constituting the sliding surface is sheared between the
layers of a graphite layer bonded by the van der Waals force
as a result of friction with the sliding surface on the other
side. A part of the graphite film remains in fine recesses of
the surface of the base material, and thus the sliding surface
is smoothed and the self-lubricating property of graphite can
be exhibited with respect to the sliding surface on the other
side. Accordingly, a stable low-friction effect can be
obtained under a wide range of conditions of use such as
fluid and boundary lubrication regions and a non-lubricated
environment.

It may be preferable that the graphite film is lower in
hardness than the sliding surface of remaining one of the
sliding components. According to this preferable configu-
ration, the graphite film is softer than the sliding surface of
the remaining one of the sliding components, and thus the
sliding surface of the remaining one of the sliding compo-
nents is unlikely to be damaged by friction.

It may be preferable that the graphite film is lower in
hardness than the base material. According to this preferable
configuration, the base material covered with the graphite
film is harder than the graphite film. Accordingly, the soft
graphite film is preferentially scraped and smoothing of the
sliding surface is promoted in the event of foreign matter
intrusion between the sliding surfaces, foreign matter resis-
tance can be enhanced by the exposed base material surface,
and thus both the self-lubricating property of graphite and
foreign matter resistance can be achieved between the
sliding surfaces.

It may be preferable that the graphite film has a thickness
larger than an arithmetic mean roughness Ra of a surface of
the base material. According to this preferable configuration,
the thickness of the graphite film is larger than the uneven-
ness of the base material surface, and thus a part of the
graphite film easily enters the fine recesses of the base
material and a low-friction effect is exhibited with ease.

It may be preferable that the base material is formed of
ceramics. According to this preferable configuration, the
surface roughness of the porous ceramics is more likely to
appear than that of a metal, and thus the graphite film is
easily fixed on the base material.

It may be preferable that an arithmetic mean roughness Ra
of a surface of the base material is 0.1 μm or more.
According to this preferable configuration, the graphite film
easily enters the fine recesses of the base material surface.
Accordingly, even in the event of shearing of the graphite
film attributable to friction with the sliding surface on the
other side, a part of the graphite film is held in the fine
recesses and is unlikely to fall off.

It may be preferable that the surface of the base material
is entirely covered with the graphite film. According to this
preferable configuration, a part of the graphite film on the
base material side enters every fine recess of the base
material surface, and thus the sliding surface is easily
smoothed by the graphite film being sheared.

It may be preferable that the graphite film is formed on
only the sliding surface of the one of the sliding components
sliding relative to each other. According to this preferable
configuration, the mass of the sheared graphite film transfers
to the unevenness of the sliding surface of the remaining one
of the sliding components, and thus the sliding surface of the remaining one of the sliding components is also smoothed and a more satisfactory low-friction effect can be obtained.

DESCRIPTION OF EMBODIMENTS

A mode for implementing the sliding component according to the present invention will be described below based on an embodiment.

EMBODIMENT

The sliding components according to the embodiment of the present invention will be described with reference to FIGS. 1 to 4. It should be noted that a mode in which the sliding component is a mechanical seal will be described as an example in the present embodiment. In addition, in the following description, the inner diameter side of the sliding component constituting the mechanical seal is a low-pressure fluid side as a leak side and the outer diameter side is a high-pressure fluid side (e.g., sealing target gas side) as a sealing target fluid side.

Figure 1:
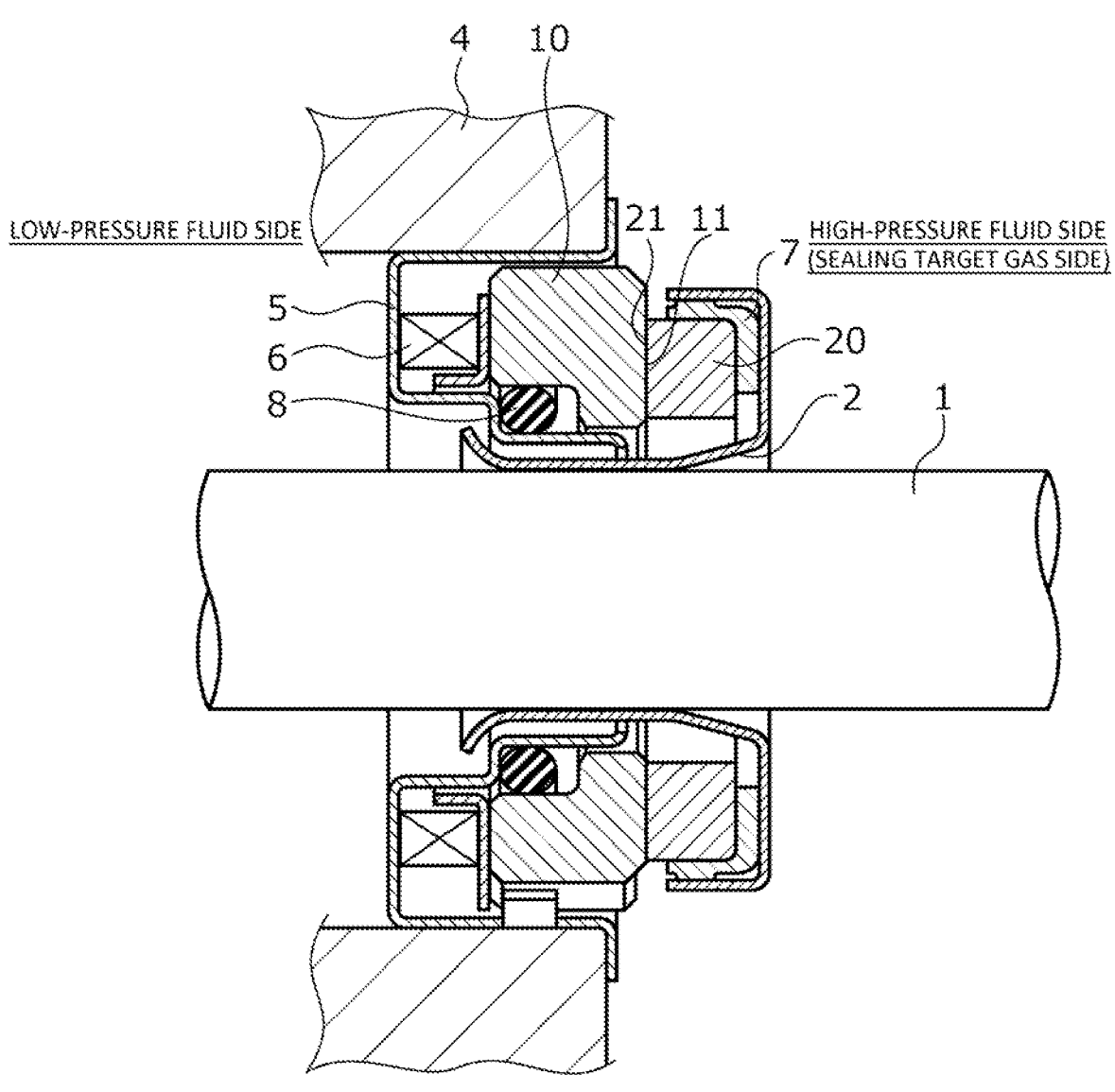
FIG. 1 is a vertical cross-sectional view illustrating an example of a mechanical seal including sliding components according to an embodiment of the present invention.

The mechanical seal for general industrial machinery illustrated in FIG. 1 is an inside-type mechanical seal that seals a sealing target gas to leak from the outer diameter side toward the inner diameter side of a sliding surface in a non-lubricated (that is, dry) environment in which no liquid is interposed between the sliding surfaces. The mechanical seal mainly includes an annular rotating seal ring 20, which is a sliding component provided on a rotary shaft 1 in a state of being rotatable together with the rotary shaft 1 via a sleeve 2, and an annular stationary seal ring 10, which is a sliding component provided on a seal cover 5 fixed to a housing 4 of an attachment target device in a non-rotating state and a state of being movable in the axial direction. A sliding surface 11 of the stationary seal ring 10 and a sliding surface 21 of the rotating seal ring 20 slide closely with each other by a spring 6 urging the stationary seal ring 10 in the axial direction. In addition, the space between the rotating seal ring 20 and the sleeve 2 is sealed by a gasket 7 and the space between the stationary seal ring 10 and the seal cover 5 is sealed by an O-ring 8.

The stationary seal ring 10 and the rotating seal ring 20 in the present embodiment are formed of silicon carbide (abbreviated as SiC). It should be noted that the stationary seal ring 10 and the rotating seal ring 20 may be made of different materials without being limited to those made of the same material.

Figure 2:
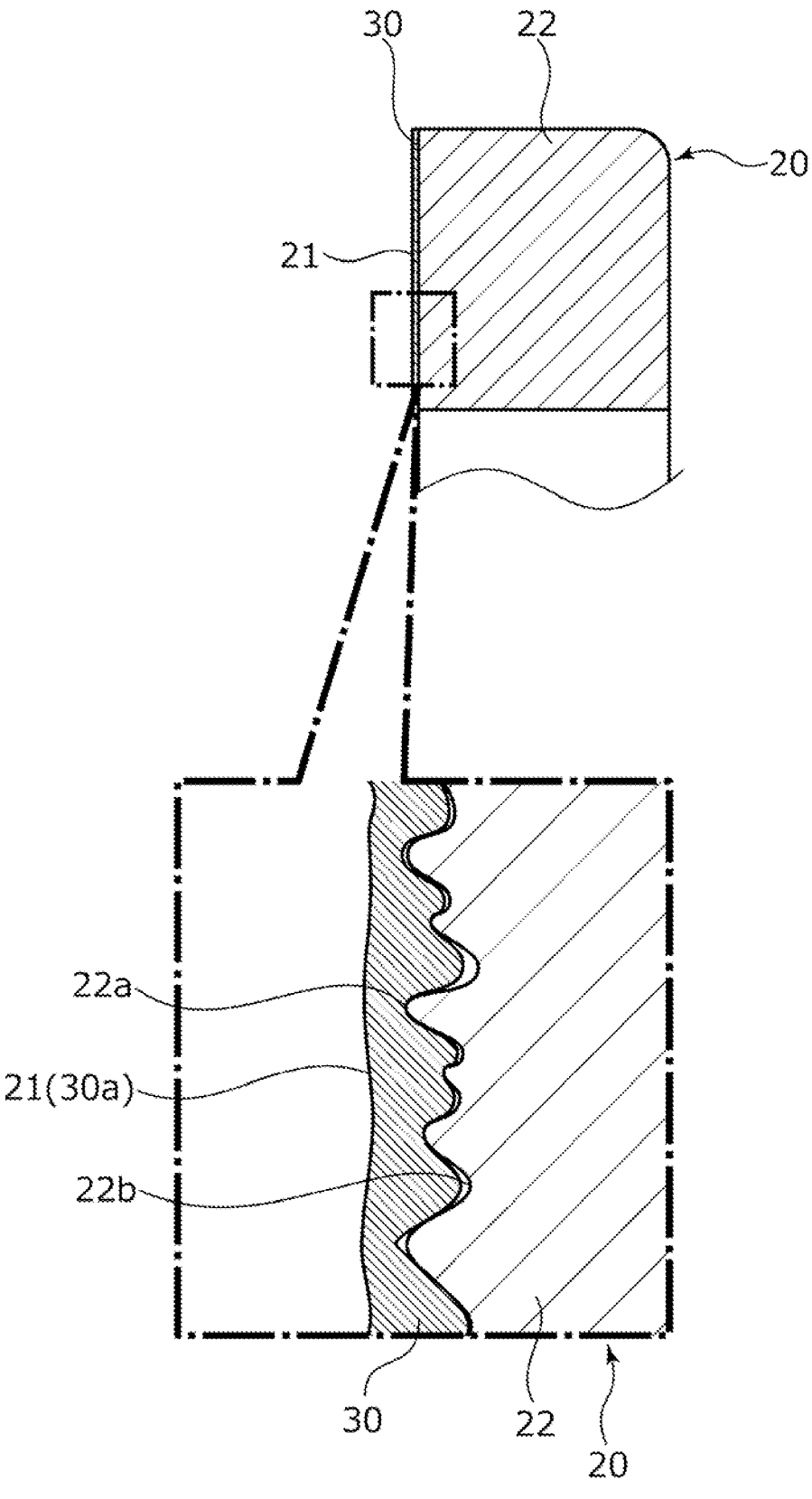
FIG. 2 is an enlarged cross-sectional view illustrating a sliding surface of a rotating seal ring that is yet to be used and covered with a graphite film in the embodiment.
Figure 3:
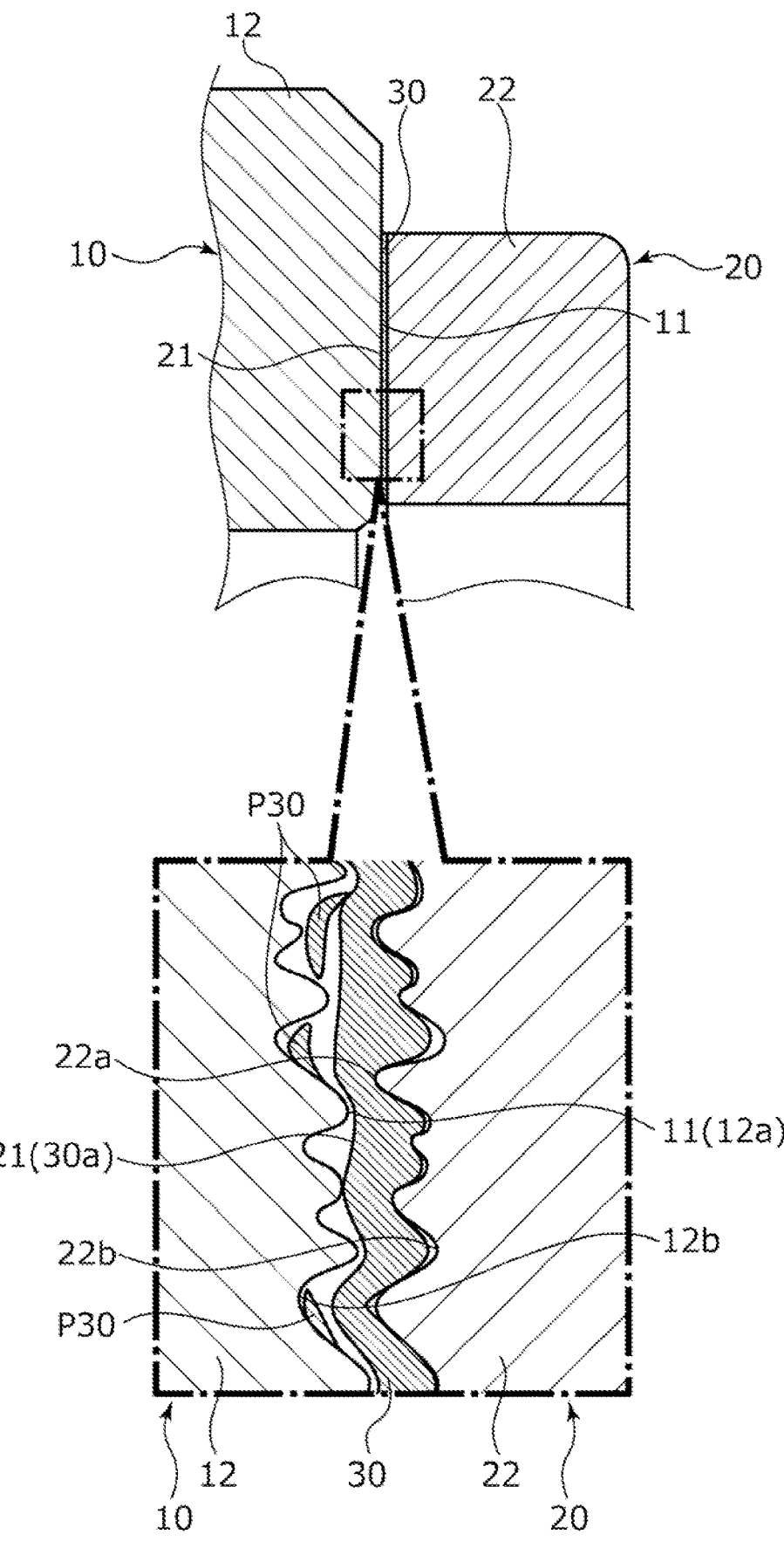
FIG. 3 is an enlarged cross-sectional view illustrating a state where a shear mass is generated as a result of sliding between the sliding surface of the rotating seal ring where the graphite film is formed and a sliding surface of a stationary seal ring in the embodiment.
Figure 4:
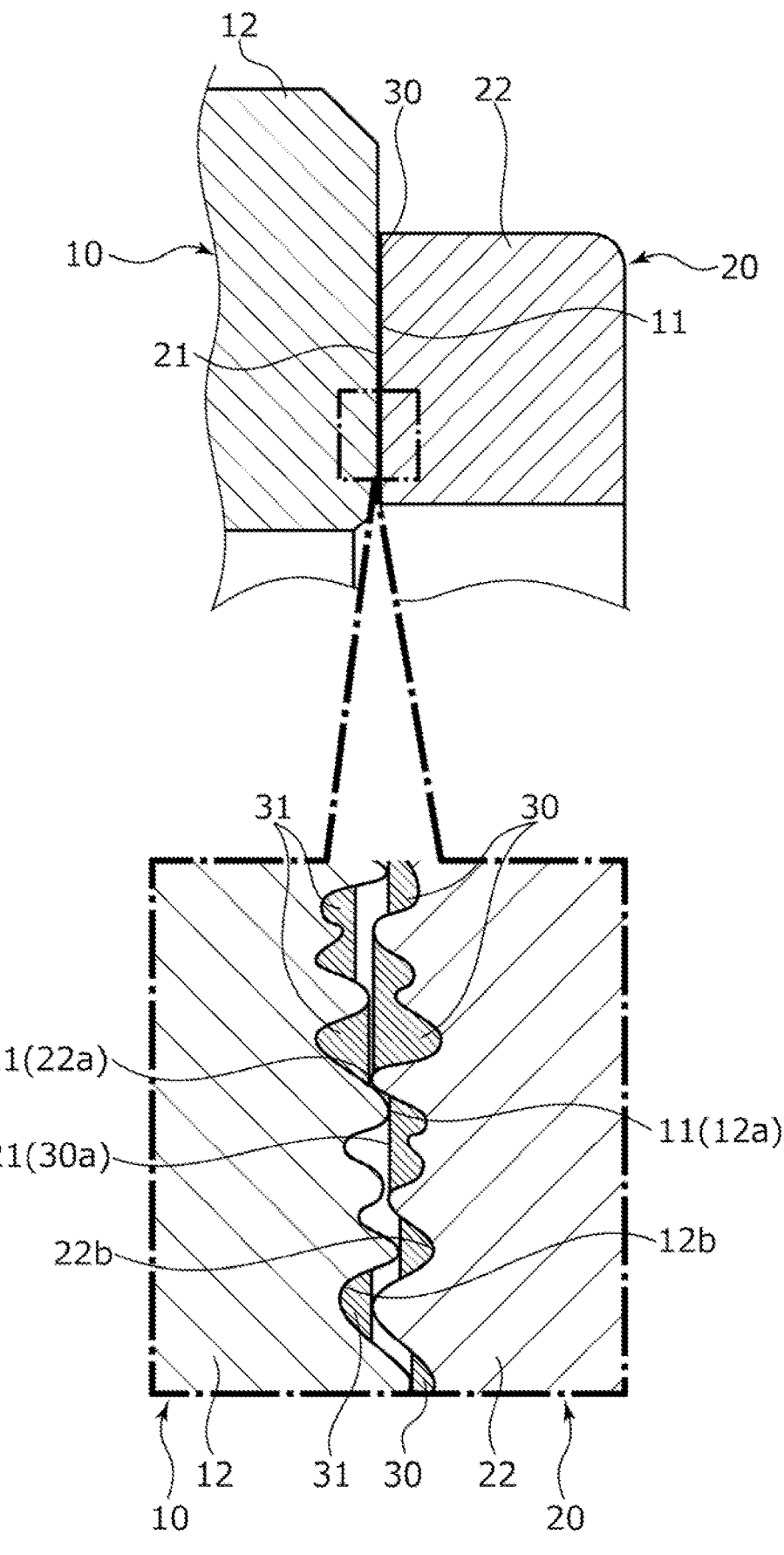
FIG. 4 is an enlarged cross-sectional view illustrating a state after the sliding between the sliding surface of the rotating seal ring where the graphite film is formed and the sliding surface of the stationary seal ring in the embodiment.

As illustrated in FIG. 2, the rotating seal ring 20 is configured by a graphite film 30 covering a SiC base material 22 as a base material. In other words, the substantially sliding surface 21 of the rotating seal ring 20 is configured by a surface 30a of the graphite film 30. It should be noted that an aspect in which the thickness of the graphite film 30 is thicker than the surface roughness of the SiC base material 22 and the graphite film 30 covers the entire surface of an axial end surface portion 22a of the SiC base material 22 as will be described later will be described as to the sliding surface 21 of the present embodiment and yet the present invention is not limited thereto. For example, as for the sliding surface 21, a part of the end surface portion 22a of the SiC base material 22 (such as the top of the mountain of the surface) may be exposed without being covered with the graphite film 30 by the graphite film 30 being thin. In addition, the graphite film 30 may directly cover the SiC base material 22. In this case as compared with a case where an intermediate layer or the like is provided, there is no need to form an intermediate layer and there are no restrictions on the conditions of use put by the intermediate layer.

In addition, in the present embodiment, the graphite film 30 has an existing and known layered structure of carbon and is a general term for thin films of substances mainly configured by carbon atoms, mainly having a hexagonal crystal structure as a type of carbon material, and analyzed by Raman spectroscopic analysis or the like. In addition, in the present embodiment, no graphite film is formed on the sliding surface 11 of the stationary seal ring 10 (see FIG. 3).

Specifically, the graphite film 30 of the present embodiment is a thin film having a composition in which the ratio of the surface region where graphite component characteristics are conspicuous is 50% to 100%. In the graphite film 30, carbon atoms constitute a sheet-shaped crystal structure in a hexagonal system by a covalent bond and the thin sheet-shaped crystal structure is bonded in layers by the van der Waals force to form a graphite layer. It should be noted that some of the carbon atoms may form a glassy carbon region configured by uncrystallized amorphous carbon.

The graphite film 30 is formed by directly applying a precursor solution so as to cover the axial end surface portion 22a of the SiC base material 22 constituting the rotating seal ring 20, performing drying and curing, and then performing firing after thermal curing at a temperature of 800° C. or higher (preferably 1200° C. or higher). The precursor solution is obtained by dissolving, in an organic solvent, one or more thermosetting resins selected from phenol resin, melamine resin, urea resin, epoxy resin, unsaturated polyester resin, silicone resin, diallyl phthalate resin, polyimide resin, polyurethane resin, etc. It should be noted that the graphite film 30 can be prevented from being torn by being formed into a thin film having a thickness in a predetermined range and the thermosetting resin can be graphitized by firing at a relatively low temperature. Further, it should be noted that the graphite film 30 before initial use may be formed so as to have a thickness of 1 μm to 100 μm. Peeling occurs in relation to the SiC base material 22 at a film thickness exceeded by the value, and cracking occurs during the film formation at a film thickness exceeding the value.

In addition, the surface of the end surface portion 22a of the SiC base material 22 covered with the graphite film 30 has an arithmetic mean roughness Ra of 0.1 μm or more and the graphite film 30 is formed with a part of the graphite film 30 inserted in fine recesses 22b of the end surface portion 22a of the SiC base material 22.

In addition, a test was conducted using a nanoindenter in measuring the hardness of the graphite film 30 and the hardness of a SiC base material 12 and it was confirmed that the SiC base material 12 showed a harder value than the graphite film 30.

As described above, a graphite layer is formed by thermosetting resin firing in the graphite film 30 of the present embodiment. It should be noted that the film composition in the graphite film 30 can be determined by film composition analysis by, for example, XRD, Raman spectroscopic analysis, or thermal analysis.

Next, the result of preparation at different degrees of graphitization and a Ring-on-Ring friction/wear test under the following conditions will be described with regard to the rotating seal ring 20 where the graphite film 30 in the present embodiment is formed. It should be noted that the graphite film 30 of the rotating seal ring 20 is formed at a uniform thickness of 20 μm. In addition, the stationary seal ring 10 is graphite film-less as described above and at least the sliding surface 11 is formed of SiC.

Load=10 N

Surface pressure of sliding surface of stationary seal ring=0.25 MPa

Rotation speed of rotating seal ring=74 rpm

PV value=0.008 MPa. m/sec

Test time=up to sliding distance of 1000 m

Sealing target fluid=atmosphere

In addition, the graphitized area region of the surface of the graphite film 30 of the rotating seal ring 20 in the present embodiment was analyzed by Raman spectroscopic analysis. It should be noted that the degree of graphitization of the surface of the graphite film 30 was analyzed using a spectroscopic analyzer manufactured by Nanophoton Corporation and measurement was performed at a central wavenumber of 2082.24 cm$^{-1}$, an excitation wavelength of 532.36 nm, and a laser intensity of 0.8 mW. IG is the intensity of the G peak at a central wavenumber of 1574 to 1576 cm$^{-1}$. ID is the intensity of the D peak at a central wavenumber of 1344 to 1348 cm$^{-1}$. A plurality of points in a specific region were measured in the sample and intensity ratio ID/IG was calculated from the G peak intensity and the D peak intensity of the averaged spectrum in carrying out the graphite or non-graphite determination.

Table 1 shows analysis results on the degree of graphitization (e.g., area %) of the surface of the graphite film 30 of the rotating seal ring 20 in the present embodiment and the result of the Ring-on-Ring friction/wear test. It should be noted that usability was determined with regard to the Ring-on-Ring friction/wear test, in a non-lubricated environment, and based on whether or not seizure of the sliding surface was exhibited (○ indicating seizure-free). Further, it should be noted that the presence or absence of transfer film formation on the sliding surface 11 of the stationary seal ring 10 was checked after the Ring-on-Ring friction/wear test. In checking the presence or absence, it was determined that the sliding surface 11 of the stationary seal ring 10 is transfer film-less on condition that a transfer film has an intra-contact range area ratio of 5% or less at a magnification of optical microscope 5× with deposits removed by air blowing on the sliding surface 11 of the stationary seal ring 10.

TABLE 1

| Sample | Degree of graphitization (area %) | Usability | Transfer film formation |
|---|---|---|---|
| A | 90 | ○ | Formed |
| B | 70 | ○ | Formed |
| C | 50 | ○ | Formed |

6

TABLE 1-continued

| Sample | Degree of graphitization (area %) | Usability | Transfer film formation |
|---|---|---|---|
| D | 30 | X | Formed |
| E | 10 | X | Not formed |

Regarding the graphite film 30 of the rotating seal ring 20 lacking sliding surface seizure with a transfer film formed on the sliding surface 11 of the stationary seal ring 10 in the non-lubricated environment, it was found that the degree of graphitization of the surface was 50% or more (see Samples A, B, and C).

Next, the result of a Ring-on-Ring friction/wear test under the following conditions will be described with regard to the rotating seal ring 20 where the graphite film 30 is formed with a degree of graphitization of 70%. In addition, the stationary seal ring 10 is graphite film-less as described above and at least the sliding surface 11 is formed of SiC.

Load=10 N

Surface pressure of sliding surface of stationary seal ring=0.25 MPa

Rotation speed of rotating seal ring=74 rpm

PV value=0.008 MPa. m/sec

Test time=up to sliding distance of 1000 m

Sealing target fluid=atmosphere

Table 2 shows the film formation result of the graphite film 30 of the rotating seal ring 20 (see Samples F to G) in the present embodiment and the result of the Ring-on-Ring friction/wear test. It should be noted that usability was determined with regard to the Ring-on-Ring friction/wear test, in a non-lubricated environment, and based on whether or not seizure of the sliding surface was exhibited as in the case of Table 1. Further, it should be noted that the presence or absence of peeling of the graphite film 30 from the sliding surface 21 of the rotating seal ring 20 and the presence or absence of cracking were checked after the Ring-on-Ring friction/wear test. In checking the presence or absence of peeling, it was determined that the peeling from the sliding surface 21 of the rotating seal ring 20 occurred on condition that the residue of the graphite film 30 in the fine recesses 22b of the end surface portion 22a has an intra-contact range area ratio of 80% or less at a magnification of optical microscope 5× with deposits removed by air blowing on the sliding surface 21 of the rotating seal ring 20. The presence or absence of graphite film cracking was checked with deposits removed by air blowing on the sliding surface 21 of the rotating seal ring 20.

TABLE 2

| Sample | Film thickness (μm) | Usability | Peeling | Cracking |
|---|---|---|---|---|
| F | 1 | ○ | Absent | Absent |
| G | 10 | ○ | Absent | Absent |
| H | 20 | ○ | Absent | Absent |
| I | 50 | ○ | Absent | Absent |
| K | 100 | ○ | Absent | Absent |
| L | 0.5 | — | Present | Absent |
| M | 120 | — | Absent | Present |

Regarding the graphite film 30 of the rotating seal ring 20 lacking sliding surface seizure, peeling of the graphite film 30 from the sliding surface 21 of the rotating seal ring 20, and cracking in the non-lubricated environment, it was found that the thickness was 1 μm to 100 μm (see Samples F, G, H, I, and K).

It should be noted that foreign matter is caught in the sliding surface 11 of the stationary seal ring 10 formed of soft carbon as a result of foreign matter intrusion between the sliding surfaces 11 and 21, the surface is roughened by the sliding surface 11 being scraped, the smoothness of the sliding surface is lost, and the friction coefficient is adversely affected in a case where the stationary seal ring 10 on the other side is formed of carbon (as a soft material) with respect to the sliding surface 21 lacking the graphite film 30 as in the case of the rotating seal ring 20 of Sample K described above. As described above, a sliding surface of a sliding component formed of carbon is problematic in terms of foreign matter resistance. On the other hand, the rotating seal ring 20 in the present embodiment is configured by the graphite film 30 covering the hard SiC base material 22, the stationary seal ring 10 on the other side is also formed of SiC (hard material), and thus the soft graphite film 30 is preferentially scraped against foreign matter intrusion between the sliding surfaces 11 and 21 and surface roughening of the SiC base materials 12 and 22 to adversely affect the friction coefficient of the sliding surface is unlikely to occur.

As described above, the graphite film 30 covers the SiC base material 22 of the rotating seal ring 20 according to the present invention. As a result, the graphite film 30 constituting the sliding surface 21 is sheared between the layers of the graphite layer bonded by a weak van der Waals force as a result of friction with the sliding surface 11 of the stationary seal ring 10 (see the enlarged part in FIG. 3). In addition, the pressure contact force between the sliding surfaces 11 and 21 results in inward pushing in the axial direction, a part of the graphite film 30 enters and remains in the fine recesses 22b of the end surface portion 22a of the SiC base material 22, and the sliding surface 21 is smoothed (see the enlarged part in FIG. 4). As a result, the graphite film 30 remaining in the fine recesses 22b is capable of exhibiting the self-lubricating property of graphite with respect to the sliding surface 11 of the stationary seal ring 10, and thus a stable low-friction effect can be obtained under a wide range of conditions of use such as fluid and boundary lubrication regions and a non-lubricated environment. Further, the graphite film 30 is formed only on the sliding surface 21 of the rotating seal ring 20, and thus a shear mass P30 (see the enlarged part in FIG. 3) derived from the graphite film 30 and generated between the sliding surfaces 11 and 21 is axially pushed in by the pressure contact force between the sliding surfaces 11 and 21, enters and transfers into fine recesses 12b of an end surface portion 12a of the SiC base material 12 constituting the sliding surface 11 of the stationary seal ring 10, and forms a transfer film 31. As a result, the sliding surface 11 of the stationary seal ring 10 is also smoothed (see the enlarged part in FIG. 4), the ratio of the SiC-graphite or graphite-graphite sliding part increases between the sliding surfaces 11 and 21, and thus a more satisfactory low-friction effect can be obtained.

In addition, the hardness of the graphite film 30 is lower than the hardness of the sliding surface 11 of the stationary seal ring 10, that is, the SiC base material 12. Accordingly, the graphite film 30 is softer than the sliding surface 11 of the stationary seal ring 10 and the sliding surface 11 of the stationary seal ring 10 is unlikely to be damaged by friction. Further, the hardness of the graphite film 30 is lower than the hardness of the SiC base material 22 of the rotating seal ring 20. Accordingly, the soft graphite film 30 is preferentially sheared and smoothing of the sliding surface 21 is promoted in the event of foreign matter intrusion between the sliding surfaces 11 and 21, foreign matter resistance can be enhanced by the end surface portion 22a of the exposed hard SiC base material 22, and thus both the self-lubricating property of graphite and foreign matter resistance can be achieved between the sliding surfaces 11 and 21.

In addition, the base material of the rotating seal ring 20 is formed of SiC as ceramics and the SiC base material 22 is porous. Accordingly, the end surface portion 22a has the multiple fine recesses 22b, where a part of the graphite film 30 enters, surface roughness is more likely to appear than in a metal, and thus the graphite film 30 is likely to be fixed on the base material surface. Further, the arithmetic mean roughness Ra of the surface of the end surface portion 22a of the SiC base material 22, where the graphite film 30 is formed, is 0.1 μm or more, and thus a part of the graphite film 30 is more likely to enter the fine recesses 22b of the end surface portion 22a. Accordingly, even in the event of shearing of the graphite film 30 attributable to friction with the sliding surface 11 of the stationary seal ring 10, a part of the graphite film 30 is held in the fine recesses 22b and is unlikely to fall off between the sliding surfaces 11 and 21.

In addition, the graphite film 30 covers the entire surface of the end surface portion 22a of the SiC base material 22. In other words, the base material surface is not exposed. As a result, a part of the graphite film 30 is in every fine recesses 22b in the end surface portion 22a, and thus the sliding surface 21 is easily smoothed by the graphite film 30 being sheared.

In addition, the graphite film 30 has a thickness of 1 μm to 100 μm, and thus peeling of the graphite film 30 from the end surface portion 22a of the SiC base material 22 and cracking of the graphite film 30 can be prevented. Accordingly, the graphite film 30 can be used as a sliding component film.

Further, the thickness of the graphite film 30 is larger than the arithmetic mean roughness Ra of the surface of the end surface portion 22a of the SiC base material 22. In other words, the thickness of the graphite film 30 is larger than the unevenness of the surface of the end surface portion 22a of the SiC base material 22. Accordingly, a part of the graphite film 30 easily enters the fine recesses 22b of the SiC base material 22, the graphite film 30 is reliably sheared by friction with the sliding surface 11 of the stationary seal ring 10, and thus a part of the graphite film 30 easily remains in the fine recesses 22b and a low-friction effect is exhibited with ease.

In addition, the graphite film 30 partially contains a glassy carbon region. Accordingly, the shear mass P30 resulting from the shearing of the graphite film 30 is likely to be small, the shear mass P30 is likely to fully enter the fine recesses 12b of the SiC base material 12 constituting the stationary seal ring 10 on the other side, and thus the transfer film 31 is likely to be formed on the sliding surface 11 of the stationary seal ring 10. It should be noted that the main region of the graphite film 30 is the graphite region made of a graphite layer although the graphite film 30 partially contains the glassy carbon region, and thus the self-lubricating property of graphite can be exhibited by friction with the sliding surface 11 of the stationary seal ring 10.

In addition, the graphite film 30 is formed directly on the end surface portion 22a of the SiC base material 22. As a result, adhesiveness is low in relation to the end surface portion 22a of the SiC base material 22. Accordingly, the graphite film 30 is more likely to be sheared as a result of friction with the sliding surface 11 of the stationary seal ring 10 than in a case where, for example, the graphite film 30 is bonded via an adhesive. As a result, peeling of the graphite film 30 can be prevented.

In addition, the base material of the rotating seal ring 20 and the sliding surface can be formed of different materials, and thus the self-lubricating property of graphite can be given by the graphite film 30 on the sliding surface 21 while the base material is given the rigidity of ceramics such as SiC. Further, the cost of the sliding component can be reduced by changing the base material to an inexpensive material.

Although an embodiment of the present invention has been described above with reference to the drawings, the specific configurations are not limited to the embodiment and any changes or additions within the scope of the present invention are included in the present invention.

For example, although the mechanical seal for general industrial machinery has been described as an example of the sliding component in the above embodiment, the mechanical seal may be replaced with another mechanical seal for an automobile, a water pump, or the like. In addition, the present invention is not limited to the mechanical seal and may be a sliding component other than a mechanical seal, examples of which include a slide bearing. Further, the graphite film 30 can be formed on the inner peripheral surface of a bearing as well and thus is also applicable to a sliding component constituting a radial bearing or the like.

In addition, although the mechanical seal to which the sliding component is applied is used in a non-lubricated environment in the above embodiment, the present invention is not limited thereto and it may be used in a fluid or boundary lubrication region in which a liquid as a sealing target fluid is interposed between the sliding surfaces.

In addition, although an example in which the graphite film 30 is provided only on the rotating seal ring 20 has been described in the above embodiment, the graphite film 30 may be provided only on the stationary seal ring 10 or may be provided on both the rotating seal ring 20 and the stationary seal ring 10.

In addition, although the stationary seal ring 10 and the rotating seal ring 20 are formed of SiC in the above embodiment, the present invention is not limited thereto and any sliding material can be applied insofar as it is used as a sliding material for a mechanical seal. It should be noted that the SiC may include a sintered body using boron, aluminum, carbon, or the like as a sintering aid and a material made of two or more types of phases having different components and compositions, examples of which include SiC in which graphite particles are dispersed and reaction-sintered SiC made of SiC and Si. In addition to the above sliding materials, other ceramics such as alumina, zirconia, and silicon nitride ($Si_3N_4$), a metal material, a resin material, a composite material, and the like can also be applied.

REFERENCE SIGNS LIST

10 Stationary seal ring (sliding component)
11 Sliding surface
12 SiC base material (base material)
12*a* End surface portion
12*b* Fine recess
20 Rotating seal ring (sliding component)
21 Sliding surface
22 SiC base material (base material)
22*a* End surface portion
22*b* Fine recess
30 Graphite film
30*a* Surface
31 Transfer film
P30 Shear mass

The invention claimed is:

1. Sliding components having sliding surfaces sliding relative to each other,
   wherein a base material of one of the sliding components is coated with a graphite film and the sliding surface of the one of the sliding components is made of the graphite film,
   the base material is formed of ceramics,
   the graphite film is brought into contact with the base material,
   the graphite film has a thickness larger than an arithmetic mean roughness Ra of a surface of the base material,
   the graphite film has a hexagonal crystal structure,
   the graphite film has a ratio of a surface area of graphitized portion with respect to all of the surface area of the graphite film of 50% to 90%, and
   the graphite film contains glassy carbon.

2. The sliding components according to claim 1, wherein the graphite film is lower in hardness than the sliding surface of remaining one of the sliding components.

3. The sliding components according to claim 1, wherein the graphite film is lower in hardness than the base material.

4. The sliding components according to claim 1, wherein an arithmetic mean roughness Ra of the surface of the base material is 0.1 μm or more.

5. The sliding components according to claim 1, wherein the graphite film is formed on only the sliding surface of the one of the sliding components sliding relative to each other.

6. The sliding components according to claim 2, wherein the graphite film is lower in hardness than the base material.

7. The sliding components according to claim 2, wherein an arithmetic mean roughness Ra of the surface of the base material is 0.1 μm or more.

8. The sliding components according to claim 2, wherein the graphite film is formed on only the sliding surface of the one of the sliding components sliding relative to each other.

9. The sliding components according to claim 3, wherein an arithmetic mean roughness Ra of the surface of the base material is 0.1 μm or more.

10. The sliding components according to claim 3, wherein the graphite film is formed on only the sliding surface of the one of the sliding components sliding relative to each other.

11. Sliding components having sliding surfaces sliding relative to each other,
    wherein a base material of one of the sliding components is coated with a graphite film and the sliding surface of the one of the sliding components is made of the graphite film,
    the base material is formed of ceramics,
    the graphite film is brought into contact with the base material,
    an arithmetic mean roughness Ra of a surface of the base material is 0.1 μm or more,
    the graphite film has a hexagonal crystal structure,
    the graphite film has a ratio of a surface area of graphitized portion with respect to all of the surface area of the graphite film of 50% to 90%, and
    the graphite film contains glassy carbon.

12. The sliding components according to claim 11, wherein the graphite film is lower in hardness than the sliding surface of remaining one of the sliding components.

13. The sliding components according to claim 11, wherein the graphite film is lower in hardness than the base material.

14. The sliding components according to claim 11, wherein the graphite film has a thickness larger than an arithmetic mean roughness Ra of a surface of the base material.

15. The sliding components according to claim 11, wherein the graphite film is formed on only the sliding surface of the one of the sliding components sliding relative to each other.

16. Sliding components having sliding surfaces sliding relative to each other, wherein a base material of one of the sliding components is coated with a graphite film and the sliding surface of the one of the sliding components is made of the graphite film, the graphite film is lower in hardness than the base material, the graphite film has a hexagonal crystal structure, the graphite film has a ratio of a surface area of graphitized portion with respect to all of surface of the graphite film of 50% to 90%, and the graphite film contains glassy carbon.

17. The sliding components according to claim 16, wherein a base material of the other of the sliding components is made of ceramics, and the sliding surface of the other of the sliding components is formed of the ceramics.

18. The sliding components according to claim 16, wherein the base material of the one of the sliding components is made of ceramics.

* * * * *